United States Patent [19]
Grattier

[11] Patent Number: 5,128,096
[45] Date of Patent: Jul. 7, 1992

[54] LOWER CONNECTOR OF A FUEL ASSEMBLY OF A NUCLEAR REACTOR HAVING A PARTICLE FILTER

[75] Inventor: Bernard Grattier, Dardilly, France

[73] Assignees: Framatome, Courbevoie; Cogema, Velizy Villacoublay, both of France

[21] Appl. No.: 508,581

[22] Filed: Apr. 12, 1990

[30] Foreign Application Priority Data

Apr. 12, 1989 [FR] France ............................. 89 04839

[51] Int. Cl.$^5$ ............................................. G21C 19/42
[52] U.S. Cl. ................................... 376/313; 376/310; 376/352
[58] Field of Search .............. 376/313, 310, 315, 314, 376/446, 352; 210/117, 232

[56] References Cited

U.S. PATENT DOCUMENTS

| | | | |
|---|---|---|---|
| 4,096,032 | 6/1978 | Mayers et al. | 376/313 |
| 4,678,627 | 7/1987 | Rylatt | 376/313 |
| 4,684,496 | 8/1987 | Wilson et al. | 376/352 |
| 4,828,791 | 5/1989 | DeMario | 376/352 |

FOREIGN PATENT DOCUMENTS 0196611 10/1986 European Pat. Off. ............ 376/313
2577345 3/1986 France .

Primary Examiner—Brooks H. Hunt
Assistant Examiner—Meena Chelliah
Attorney, Agent, or Firm—Pollock, Vande Sande & Priddy

[57] ABSTRACT

The connector comprises an adaptor plate (6), supporting feet (7) and a flat element (10) constituting a filter for the retention of particles contained in the cooling fluid of the nuclear reactor. The flat element (10) is fastened to the lower part of the supporting feet (7) of the assembly, in order, during operation, to come to rest on the lower core plate (1) of the reactor. At least one zone of the flat element (10) constitutes a filtration grating located opposite a cooling-water passage (2) through the lower core plate (1).

2 Claims, 5 Drawing Sheets

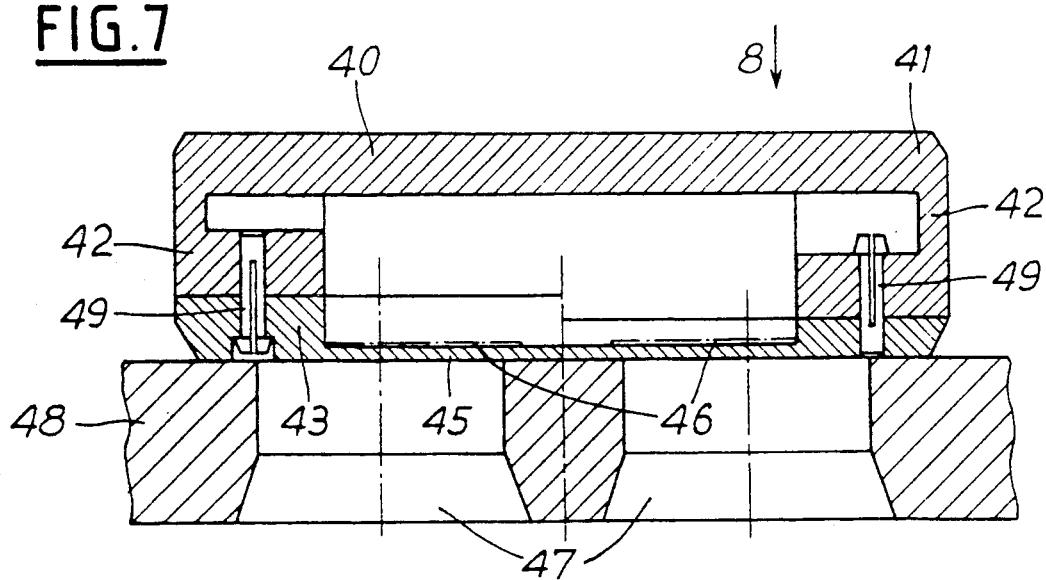
FIG.7
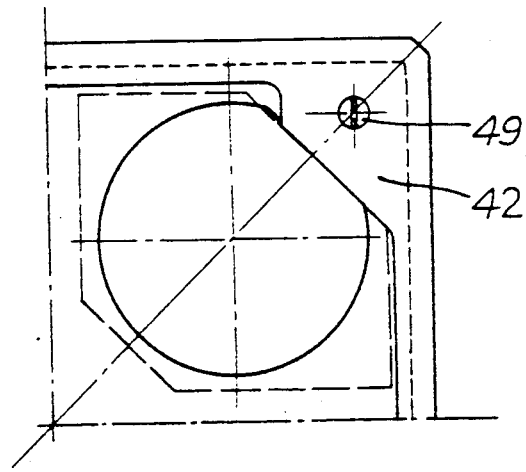
FIG.8
FIG.9
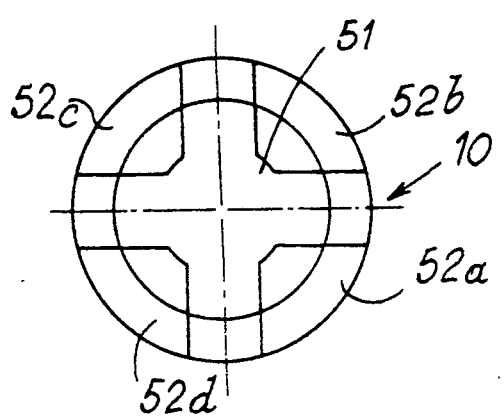
FIG.10
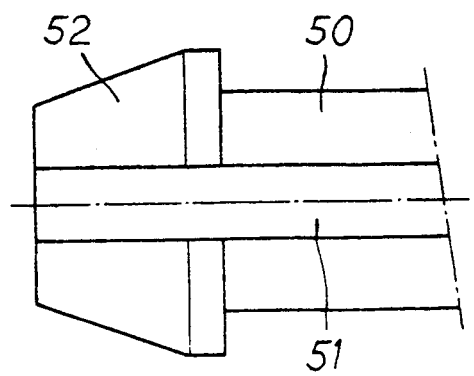

LOWER CONNECTOR OF A FUEL ASSEMBLY OF A NUCLEAR REACTOR HAVING A PARTICLE FILTER

FIELD OF THE INVENTION

The invention relates to a lower connector of a fuel assembly having a filter for the retention of particles contained in the cooling fluid of a nuclear reactor, especially a pressurized-water nuclear reactor.

BACKGROUND OF THE INVENTION

Pressurized-water nuclear reactors comprise a core consisting of prism-shaped assemblies arranged side by side in a vertical position. The assemblies comprise a framework which is closed by means of the connectors and in which the fuel rods are arranged.

One of the connectors of the assemblies, called the lower connector or "bottom nozzle", comes to rest on the lower core plate which is pierced with holes in the region of each of the assemblies to allow the cooling water of the reactor to pass through the core, in the vertical direction and from the bottom upwards.

The cooling fluid for the fuel rods passes through the adaptor plate of the lower connector via orifices, called water passages, which are either of circular (of a diameter of approximately 7 to 10 mm) or oblong (an aperture approximately 10 mm wide by 15 to 50 mm long). Debris which may be present in the primary circuit of the reactor is liable to be carried along by the circulating pressurized water, and if it is of small size (for example, smaller than 10 mm) this debris can pass through the adaptor plate of the lower connector, the water passages of which have a large cross-section. This debris can become jammed between the fuel rods and the cells of the first grid, i.e., the spacer grid, holding the rods in the form of a regular network, arranged as low as possible in the assembly. This debris, subjected to the axial and transverse hydraulic stresses, which are appreciable in this zone, can wear produce on the jacket of the fuel rod. This may result in a loss of sealing of this jacket and an increase in the rate of activity of the primary circuit of the reactor.

Devices making it possible to filter the cooling fluid of the reactor, either during the hot-running tests or even during the operation of the reactor, have therefore been proposed.

In the first case, the filter elements can be connected to the lower core plate and arranged thereon in the position of the fuel assemblies before the fueling of the core, as described, for example, in FR-A-2,577,345.

In the second case, the filter elements are associated with the fuel assemblies and are generally arranged in their lower connector. The filter elements fastened in the lower connectors of the fuel assemblies usually consist of sheet-metal or metal-wire structures which make it possible to stop the debris whose size is smaller than the largest dimension of the passage cross-section between a fuel rod and a grid cell.

Such filter elements are described, for example, in the documents US-A-4,664,880, US-A-4,684,496 and EP-A-0,196,611.

Such devices can be complex and introduce a relatively high head loss into the circulation of the cooling fluid through the fuel assembly.

Furthermore, these devices placed in the lower connector of the assembly can be relatively bulky and obstructive during the operations of loading and unloading of core assemblies and during the dismantling and refitting of the connections of the guide tubes and of the lower connector.

SUMMARY OF THE INVENTION

An object of the invention is, therefore, to provide a lower connector of a fuel assembly of a nuclear reactor, comprising an adaptor plate, supporting feet intended to come to rest on the lower core plate of the reactor, and a filter for the retention of particles contained in the cooling fluid of the reactor, consisting of a flat element having at least one zone constituting a filtration grating, effective filtration of the fluid being carried out in the region of the connector by means of the flat element, without introducing an excessive head loss into the circulation of the cooling fluid, without increasing the bulk of the fuel assembly in the region of its lower connector, while at the same time preserving the possibility of easily dismounting this connector.

To this end, the element of flat form is fastened to the lower part of the supporting foot of the assembly, in order, during operation, to come to rest on the lower core plate of the nuclear reactor, the zone constituting the filtration grating being located opposite a cooling-water passage through the lower core plate.

BRIEF DESCRIPTION OF THE DRAWINGS

Several embodiments of a lower connector of a fuel assembly according to the invention will now be described by way of example, with reference to the accompanying drawings.

FIG. 7 is a vertical sectional view of a third embodiment of a lower fuel-assembly connector according to the invention.

FIG. 8 is a partial plan view in the direction of 8 of FIG. 7.

FIG. 9 is a detail plan view of a means for the fastening of the retention filter of the connector illustrated in FIG. 7.

FIG. 10 is a side view, in the direction of arrow, of the fastening means illustrated in FIG. 9.

DESCRIPTION OF PREFERRED EMBODIMENTS

Figure 1:
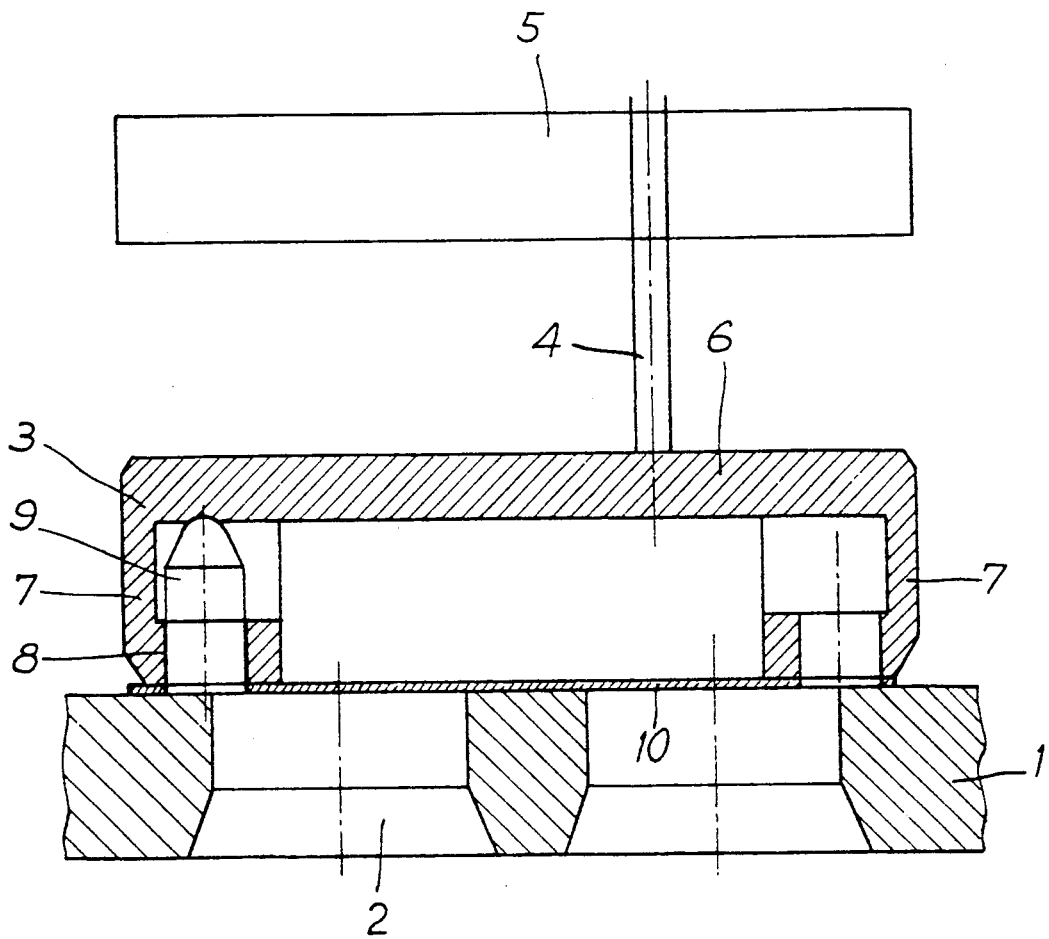
FIG. 1 is a schematic view in vertical section of a lower connector of a fuel assembly according to the invention.

FIG. 1 shows the lower core plate 1 of a pressurized-water nuclear reactor, through which pass water-passage holes 2 vertically in line with a fuel assembly, part of the framework of which can be seen in FIG. 1.

The framework comprises, in particular, a lower connector 3, a set of guide tubes such as 4, and spacer grids such as 5.

The lower connector 3 comprises an adaptor plate 6, in which the ends of the guide tubes 4 are fastened, and supporting feet 7 which can have an orifice 8 ensuring the positioning of the fuel assembly on centering studs 9 of the lower core plate 1.

According to the invention, a flat filtration element 10 is fastened under the feet 7 of the lower connector 6, so as to come to rest on the upper face of the lower core plate 1 when the fuel assembly is in operation.

The flat filtration element 10 can consist of a plate pierced with carefully calibrated filtration holes, in zones intended to come into alignment with the passage holes 2 of the lower core plate 1.

Thus, the cooling water of the reactor, arriving at the lower end of the fuel assembly via the passage holes 2, is filtered by the plate 10 which retains the debris which is liable to be carried along by the cooling fluid of the reactor and the size of which is larger than the dimension of the grating cell which can be, for example, of the order of 2 to 4 mm.

FIG. 1 does not show the elements for fastening the plate 10 under the feet 7 of the connector, only the position of this plate 10 in relation to the lower core plate 1 and to the lower connector 3.

Figure 4:
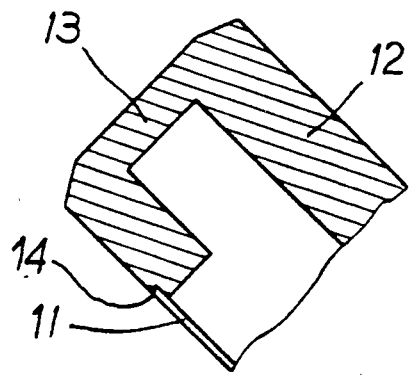
FIG. 4 is a detail view of a peripheral part of the connector illustrated in FIGS. 2 and 3.
Figure 2:
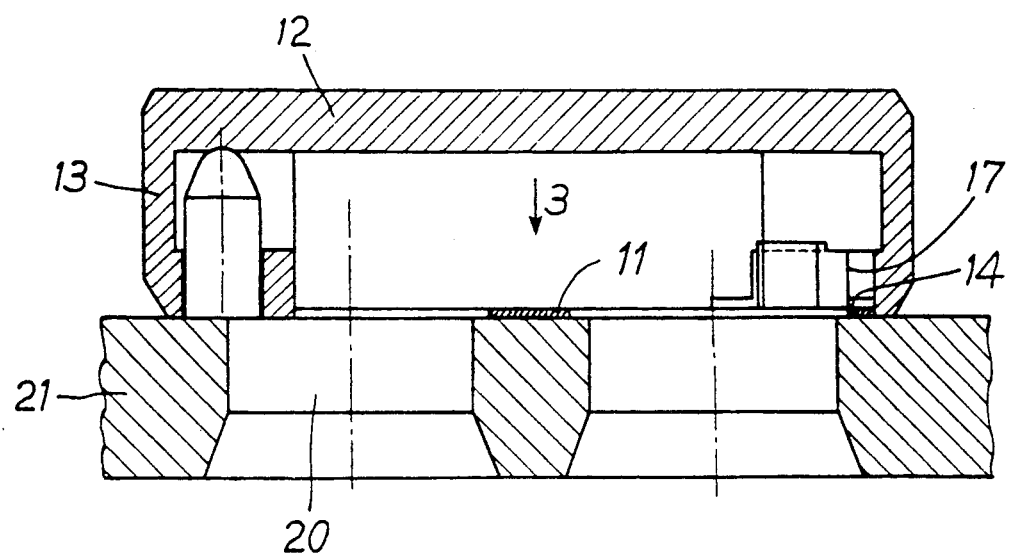
FIG. 2 is a sectional view, along line 2—2 of FIG. 3, of a first embodiment of a lower connector of a fuel assembly according to the invention.
Figure 3:
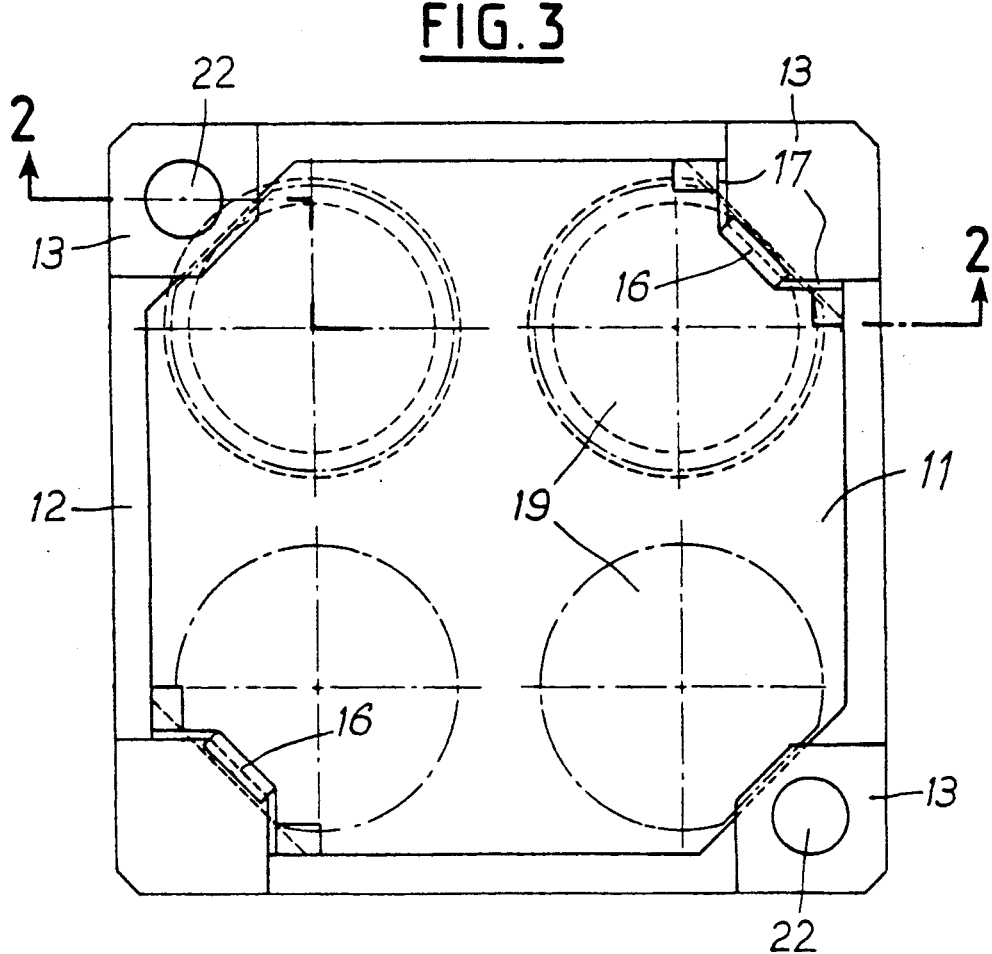
FIG. 3 is a plan view in the direction of 3 of FIG. 2.

FIGS. 2, 3 and 4 show a first embodiment of the elements for fastening a debris retention plate 11 under the feet 13 of a lower connector 12 of a fuel assembly.

Each of the feet 13 is machined so as to form a recess 14, the height of which corresponds to the thickness of the plate 11.

The corners of the plate 11 engage into the recesses 14 of the feet 13, in such a way that the assembly can rest on the lower core plate by means of the lower surface of the feet 13. This lower surface is carefully machined so as to ensure perfect vertical alignment of the fuel assembly. Moreover, the plate 11 is retained against the feet 13 and can thus withstand the hydraulic thrust attributable the circulation of the cooling fluid.

Furthermore, with the plate 11, at two of its opposite corners, has raised edges 16 bent in their upper part to form a shoulder coming into engagement on the upper part of the corresponding foot 13.

The raised edges 16 form elastic snap strips ensuring that the plate 11 is fastened to the connector 12, when this plate is engaged into the frame of the connector 2 from underneath, in such a way that the corners of the plate having the edges 16 are engaged on two feet 13 arranged along a diagonal of the connector.

On either side of the raised snap edge 16, two raised edges 17 arranged angularly along the faces of the foot 13 ensure perfect positioning of the plate 11 within the connector 12.

The plate 11 has four circular zones 19, the shape and dimensions of which correspond to those of the cooling-water passage holes 20 through the lower core plate 21.

In the zones 19, the plate 11 has through-holes, the dimension of which makes it possible to ensure the filtration of debris of a particular size.

These zones 19 constitute the active parts of the retention plate 11.

The elastic snap strips 16 are engaged on the feet 13 not having any positioning holes 22 (called S holes) which are arranged along a diagonal of the connector 12.

Figure 5:
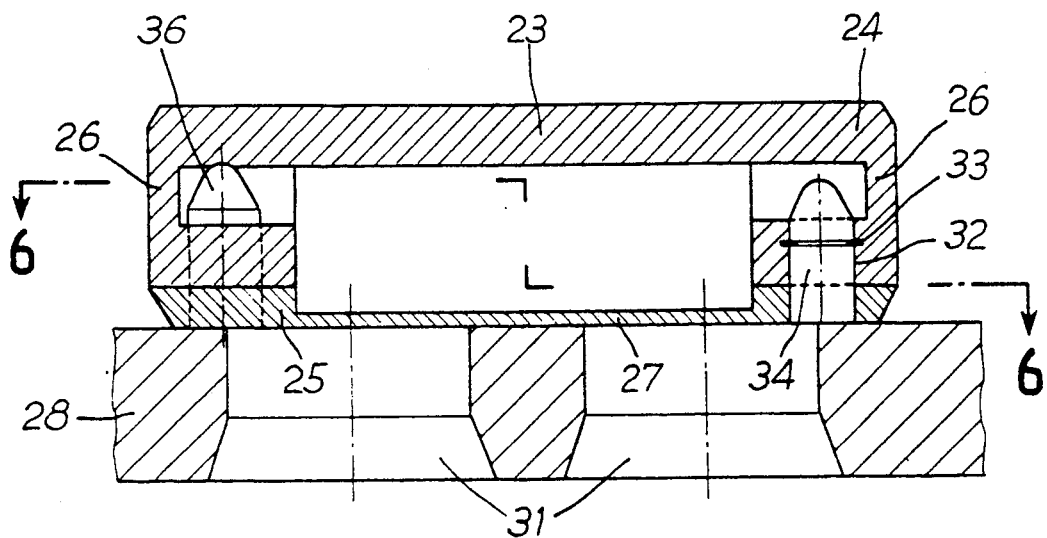
FIG. 5 is a vertical section view along line 5—5 of FIG. 6, of a second embodiment of a lower fuel-assembly connector according to the invention.
Figure 6:
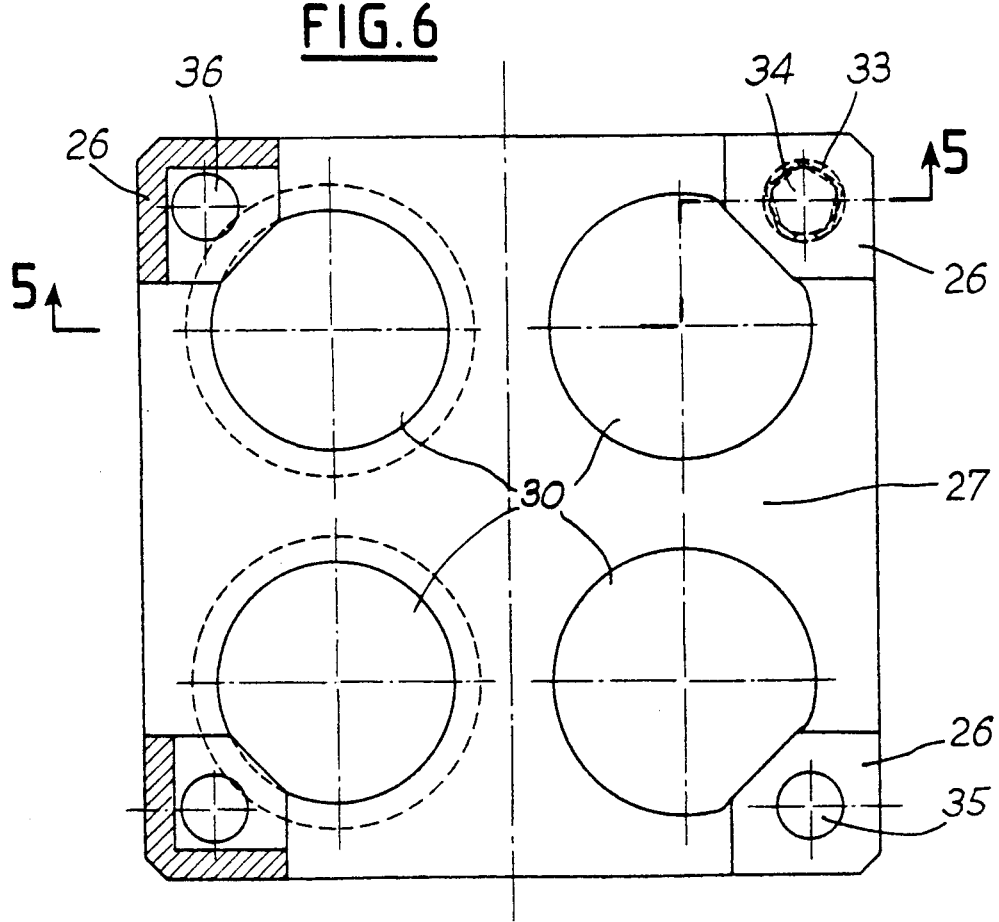
FIG. 6 is a sectional view along line 6—6 of FIG. 5.

FIGS. 5 and 6 show a second embodiment of a lower fuel-assembly connector according to the invention which has a debris retention filter in its lower part.

The lower connector 23 comprises an upper part 24, substantially identical to a fuel-assembly connector of conventional structure, but having feet 26 of smaller height, and a lower part 25 which is attached to the lower end of the feet 26 and the central part 27 of which constitutes the filtration plate of the lower connector 23.

The lower connector 23 rests on the lower core plate 28 by means of the part 25 of the connector. The central part of this part 25 forming the plate 27 has four active zones 30 located opposite the water-passage holes 31 through the lower core plate 28.

These active parts 30 consist of circular zones in which water-passage holes pass through the plate 27, ensuring that debris of a particular size is stopped.

The part 25 of the connector is snap-fitted to the part 24. For this purpose, the part 25 has at two of its corners, studs 34 intended for engaging into a bore 32 of a corresponding foot 26 of the part 24 of the connector.

An elastic ring 33 having a hexagonal inner contour and engaged on the stud 34 snaps into a groove of the bore 32 when the stud 34 is introduced by pushing into this bore. This affords a sufficient hole of the part 25 of the connector 23 on the part 24 to ensure the transport of the assembly equipped with the retention filter 27.

In general, two feet 26 arranged along one diagonal of the connector 23 have a bore 32 making it possible to engage a stud 34.

Along the other diagonal of the connector 23, the feet 26 have holes 35 for the passage of positioning studs 36 for the fuel assembly, these projecting on the upper face of the lower core plate 28.

FIGS. 7, 8, 9 and 10 illustrate a third embodiment of a lower connector 40 according to the invention.

The connector 40, like the connector 23 shown in FIGS. 5 and 6, comprises an upper part 41, the form of which is identical to the form of a lower fuel-assembly connector, but with feet 42 of less height, and a lower part 43 which is attached to the lower end of the feet 42 and the central part 45 of which forms an anti-debris filtration plate having active parts 46, in which the plate 45 is pierced with holes of specific dimension, the parts 46 being located above the orifices 47 passing through the lower core plate 48.

The lower part 43 of the connector 40 is fastened to the lower end of the feet 42 of the upper part 41 by means of snap-in studs 49.

The snap-in studs 49 comprise a shank 50, in which two slots at 90° 51 are machined over a particular length, and a widened head 52 of frustoconical form, divided into four parts 52a, 52b, 52c and 52d as a result of the extension of the cross-shaped slots 51.

One of the snap-in studs 49 is fastened by means of its shank to one of the feet 42 of the upper part 41 of the connector 40. The other snap-in stud 49 is fastened to the lower part 43 of the connector 40 having the anti-debris filtration plate 45.

The parts 43 and 41 of the connector are joined together by engaging the stud 49 connected to the part 43 into a hole passing through a foot 42 of the upper part 41 of the connector and by simultaneously engaging the stud 49 connected to the upper part 41 of the connector 40 into an orifice passing through the lower part 41 of the connector and having a lower part of widened diameter.

The engagement of the studs 49 into the corresponding orifices is made easier by the frustoconical form of the head 52, the four parts of which are capable of coming nearer to one another so as to allow the stud to pass into the corresponding hole.

When the head 52 of the stud 49 comes out above the foot of the assembly or into the widened part of the bore passing through the lower part 43 of the connector, the four parts of the head 52 move apart from one another radially, in order to ensure that the two parts of the connector are fastened to one another.

Figure 11:
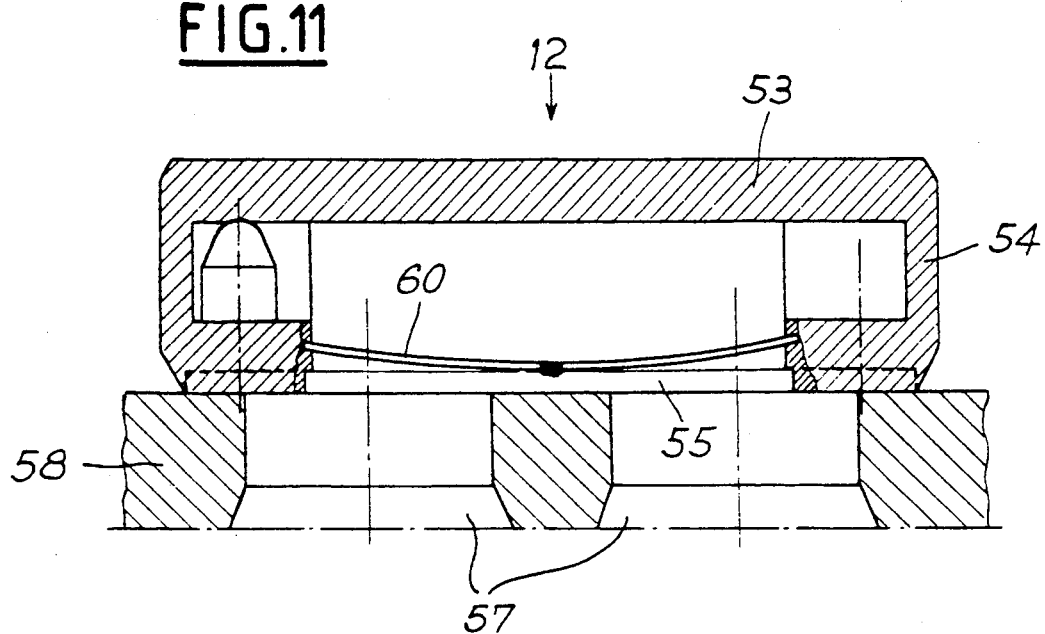
FIG. 11 is a vertical sectional view of a fourth embodiment of a lower connector according to the invention.
Figure 12:
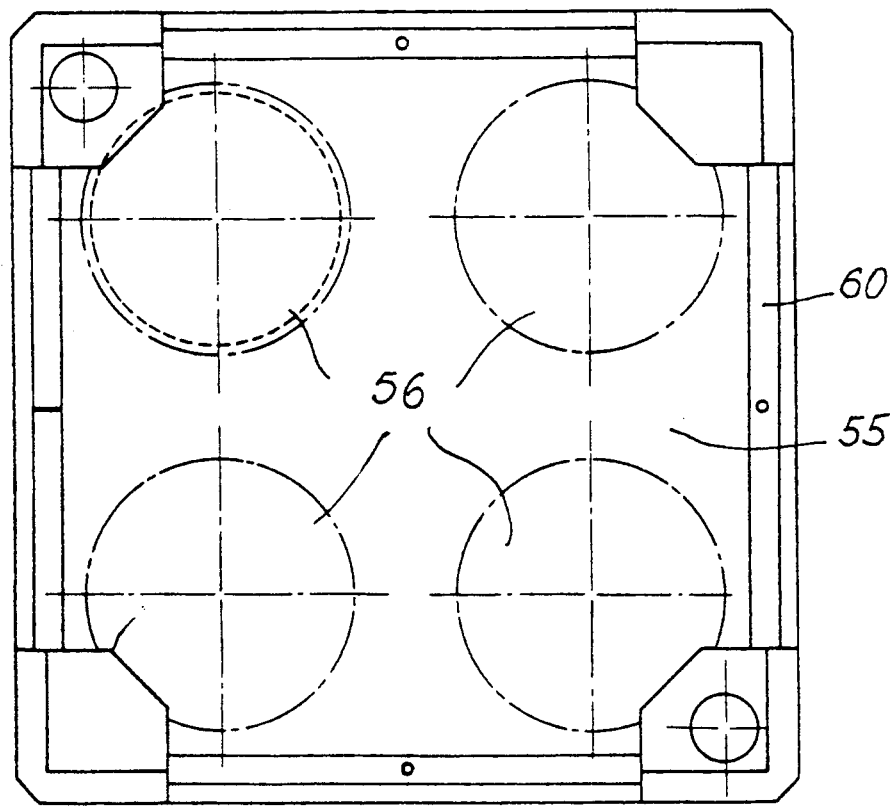
FIG. 12 is a plan view in the direction of arrow 12 of FIG. 11.

FIGS. 11 and 12 illustrate a connector 53 according to a fourth embodiment of the invention.

The connector 53 has feet 54, the lower part of which is machined to receive an anti-debris filtration plate 55. The plate 55 comprises four active zones 56 pierced with holes of a specific dimension and located in the region of the through-passages 57 of the lower core plate 58.

Four elastic strips 60 are fastened along the edges of the fixing plate 55, so as to be engaged between the feet 54 of the connector 53 when the plate 55 is pushed into the connector, until they take their place in the recesses machined in the feet 54.

The ends of the elastic strips 60 are then received in cavities machined on the inner surface of the feet 54, in order to obtain the locking of the fastening plate 55 in position on the connector 53.

The elastic strips 60 are fastened to the plate 55 by their central part by transparence or resistance welding or by riveting.

At all events, the plate forming the filter for the retention of particles contained in the cooling fluid of the reactor can be fastened under the lower connector of the fuel assembly quickly and with very good positioning.

The flat element constituting the debris retention filter does not increase the bulk of the assembly and does not impede the handling or dismounting thereof, inasmuch as it can be easily separated from the lower connector.

Furthermore, this flat element introduces a slight head loss into the circulation of the cooling fluid, since the holes of the active parts are located directly at the exit of the passages 20 through the lower core plate 21.

If the lower connector is made in two parts, the lower part having the debris retention plate, fastening is carried out only along one diagonal of the connector by means of the snap-in studs. This part of the connector must therefore have high rigidity, to be prevented from coming loose in the region of the feet in which fastening means are not engaged, during handling of the fuel assembly.

It is also possible to add, on the second diagonal, retaining devices, for example snap-in elastic strips, such as those described with reference to FIGS. 2 and 3.

Producing the connector with a lower part forming the debris retention plate affords the advantage of ensuring continuity between the feet of the connector, and this can improve its behavior during the handling and dismounting of the fuel assembly, the supporting surface for the assembly thus being increased, and this can provide some stability if a foot of the assembly is put down unintentionally in the region of a passage hole in the lower core plate.

There can be other embodiments of the means for fastening the flat element form constituting the filter for the retention of particles in the cooling fluid.

Preferably, these means must allow easy and quick dismounting of the filtration element, for example to gain access to the adaptor plate of the connector.

The invention is used for any fuel assembly of a water-cooled nuclear reactor.

I claim:

1. Lower connector of a fuel assembly of a nuclear reactor comprising an adaptor plate, supporting feet, and a filter for retention of particles contained in a cooling fluid of said nuclear reactor, said filter being constituted by a generally flat filtration element comprising at least one zone constituting a filtration grating, fastened to a lower part of said supporting feet in order, during operation, to come to rest on a lower core plate of said nuclear reactor, said zone constituting said filtration grating being located opposite a cooling water passage through said lower core plate, said connector comprising:

an upper part including said adaptor plate and at least a part of said supporting feet, and a lower part comprising said filtration element fastened to said lower end of said supporting feet of said upper part by fastening means consisting of a first snap-in stud fixed to said lower part of said connector, a second snap-in stud fixed to a first foot of said upper part of said connector and first and second orifices for engagement of said first and second snap-in studs, respectively, into a second foot of said upper part of said connector and into said lower part of said connector.

2. Lower connector according to claim 1, wherein said snap-in studs comprise a cylindrical shank and a frusto-conical head separated by slots into a plurality of radially deformable sectors.

* * * * *